«12» United States Patent
Kim et al.

(10) Patent No.: US 11,015,583 B2
(45) Date of Patent: May 25, 2021

(54) ELECTROOSMOTIC PUMP AND FLUID-PUMPING SYSTEM COMPRISING THE SAME

(71) Applicant: EOFLOW CO., LTD., Seongnam-si (KR)

(72) Inventors: Jesse Jaejin Kim, Seongnam-si (KR); Yongchul Song, Seongnam-si (KR)

(73) Assignee: EOFlow Co., Ltd., Seongnam-si (KR)

( * ) Notice: Subject to any disclaimer, the term of this patent is extended or adjusted under 35 U.S.C. 154(b) by 0 days.

(21) Appl. No.: 16/313,852

(22) PCT Filed: Jun. 16, 2017

(86) PCT No.: PCT/KR2017/006343
§ 371 (c)(1),
(2) Date: Dec. 27, 2018

(87) PCT Pub. No.: WO2018/004164
PCT Pub. Date: Jan. 4, 2018

(65) Prior Publication Data
US 2019/0154011 A1    May 23, 2019

(30) Foreign Application Priority Data

Jun. 28, 2016  (KR) .................. 10-2016-0081146

(51) Int. Cl.
*F03G 7/04*    (2006.01)
*F04B 43/06*   (2006.01)
*F04B 19/00*   (2006.01)

(52) U.S. Cl.
CPC ............... *F03G 7/04* (2013.01); *F04B 19/00* (2013.01); *F04B 19/006* (2013.01); *F04B 43/06* (2013.01);
(Continued)

(58) Field of Classification Search
CPC ....... B01L 2400/0418; B01L 2200/027; B01L 3/5027; F03G 7/04; F04B 19/00;
(Continued)

(56) References Cited

U.S. PATENT DOCUMENTS 4,396,925 A * 8/1983 Kohashi ................ B41J 2/065
                                                          347/55
8,481,222 B2 * 7/2013 Otomaru ............. H01M 8/0247
                                                          429/444
(Continued)

FOREIGN PATENT DOCUMENTS

CN          105612350 A    5/2016
KR    10-2008-0056644 A    6/2008
(Continued)

OTHER PUBLICATIONS

International Search Report and Written Opinion dated Sep. 11, 2017 in PCT Application No. PCT/KR2017/006343; 13 pages.
(Continued)

*Primary Examiner* — Dominick L Plakkoottam
(74) *Attorney, Agent, or Firm* — Knobbe, Martens, Olson & Bear, LLP

(57) ABSTRACT

Provided are an electroosmotic pump, including: a membrane; a first electrode which is provided on one surface of the membrane, including a porous support including an insulator and an electrochemical reaction material formed on the porous support; and a second electrode which is provided on the other surface of the membrane, including a porous support including an insulator and an electrochemical reaction material formed on the porous support, and a fluid-pumping system including the electroosmotic pump.

18 Claims, 8 Drawing Sheets

(52) U.S. Cl.
CPC ............... *F05B 2280/2004* (2013.01); *F05B 2280/6015* (2013.01)

(58) Field of Classification Search
CPC ........ F04B 19/006; F04B 43/06; F04B 17/00; F05B 2280/2004; F05B 2280/6015
See application file for complete search history.

(56) References Cited

U.S. PATENT DOCUMENTS

| | | | |
|---|---|---|---|
| 9,314,567 B2 | 4/2016 | Shin et al. | |
| 9,469,554 B2 | 10/2016 | Zheng et al. | |
| 9,745,971 B2 | 8/2017 | Shin et al. | |
| 2003/0085651 A1* | 5/2003 | Takahashi | H01J 29/925 313/496 |
| 2005/0100780 A1* | 5/2005 | Unoki | H01M 8/023 429/414 |
| 2005/0230080 A1* | 10/2005 | Paul | F04B 19/006 165/47 |
| 2008/0260542 A1* | 10/2008 | Nishikawa | B01L 3/565 417/48 |
| 2009/0126813 A1* | 5/2009 | Yanagisawa | F04B 19/006 137/831 |
| 2009/0260990 A1* | 10/2009 | Yanagisawa | C04B 35/14 204/641 |
| 2010/0328841 A1* | 12/2010 | Reinhoudt | C02F 1/46109 361/301.4 |
| 2011/0097215 A1 | 4/2011 | O'Shaughnessy et al. | |
| 2011/0168558 A1* | 7/2011 | Fransaer | C09D 5/024 204/477 |
| 2012/0321952 A1* | 12/2012 | Kimura | H01M 4/80 429/218.1 |
| 2013/0041353 A1* | 2/2013 | Shin | A61M 5/14248 604/892.1 |
| 2013/0153425 A1* | 6/2013 | Puleo | F04B 19/006 204/627 |
| 2013/0153797 A1* | 6/2013 | Puleo | B01L 3/50273 251/12 |
| 2013/0156615 A1* | 6/2013 | Puleo | A61K 9/0004 417/410.1 |
| 2013/0276851 A1* | 10/2013 | Crispin | H01L 35/28 136/201 |
| 2014/0088506 A1 | 3/2014 | Heller | |
| 2014/0220400 A1 | 8/2014 | Kwon et al. | |
| 2015/0140289 A1* | 5/2015 | Ferro | G03F 7/0046 428/195.1 |
| 2016/0025083 A1 | 1/2016 | Shin | |
| 2016/0177931 A1 | 6/2016 | Shin et al. | |
| 2016/0252082 A1* | 9/2016 | Okumura | F04B 19/04 417/48 |

FOREIGN PATENT DOCUMENTS

| | | |
|---|---|---|
| KR | 10-2012-0043032 A | 5/2012 |
| KR | 10-2013-0016140 A | 2/2013 |
| KR | 10-2013-0075725 A | 7/2013 |
| KR | 10-1457629 B1 | 10/2014 |
| KR | 10-1457629 B1 | 11/2014 |
| KR | 10-1488408 B1 | 1/2015 |
| WO | WO 2004/076857 A2 | 9/2004 |

OTHER PUBLICATIONS

Supplementary European Search Report dated Oct. 22, 2019 in European Patent Application No. 17820441; 7 pages.

Fanchao, M., "Study of Porous Media Electroosmotic Pump Used for Cooling System", Southwest University, of Science and Technology, 2010; 5 pages.

Office Action dated Sep. 4, 2019 in P.R.C.Patent Application No. 201780040976.3; 19 pages.

* cited by examiner

ELECTROOSMOTIC PUMP AND FLUID-PUMPING SYSTEM COMPRISING THE SAME

BACKGROUND

Field

The present invention relates to an electroosmotic pump and a fluid-pumping system including the electroosmotic pump.

Description of the Related Technology

An electroosmotic pump is a pump which utilizes the fluid transport phenomenon that occurs when a voltage is applied to both ends of a capillary tube or porous separation membrane. Accordingly, when a pump is to be constituted using electroosmosis, electrodes for voltage application are essentially used at both ends of a capillary tube or porous separation membrane.

Conventionally, chemically-stable platinum was frequently used as an electrode material. However, platinum has a low hydrogen overpotential for water, and thus hydrogen gas is generated at the cathode when a potential difference of a few volts or more is actually applied to both ends of a porous separation membrane, and the gas generation becomes a factor that limits commercialization of the electroosmotic pump.

The problem of gas generation normally occurring at electrodes has been resolved by introducing materials which are capable of oxidation and reduction to the electrodes, instead of the electrolysis reaction of water, and silver (Ag)/silver oxide (AgO), MnO(OH), polyaniline, etc. are used as the material for the electrochemical reaction.

Meanwhile, the electrode used for the electroosmotic pump must simultaneously be able to cause an electrochemical reaction and allow a working fluid (e.g., water) to pass through.

Since the electrode must simultaneously provide a site for an electrochemical reaction and allow a working fluid to freely pass through, a carbon paper and a carbon woven fabric that exhibit high porosity have been widely used for electrodes, and those electrodes, which are manufactured by a method of electrodeposition or coating of an electrochemical reaction material (e.g., silver (Ag)/silver oxide (AgO), MnO(OH), polyaniline, etc.) to the surface of the carbon material have been widely used.

However, these electrodes which were manufactured by the method of electrodeposition or coating of an electrochemical reaction material to a porous carbon electrode (e.g., a carbon paper electrode or a carbon woven-fabric electrode) have a very challenging problem in that, as the operation of the electroosmotic pump is repeated, the electrochemical reaction material electrodeposited or coated on the electrodes is consumed and detached such that the carbon electrode surface is exposed, and a new electrochemical reaction (e.g., electrolysis of water) occurs on the exposed carbon electrode surface as a side reaction thereby rapidly increasing power consumption of the electroosmotic pump. When such a phenomenon occurs, in the case of the electroosmotic pump using a battery, the time available for its use is significantly reduced.

The amount of power required for the operation of a pump is an important factor in determining practical applicability when the pump is applied to a patch-type drug delivery device to be attached to the human body or a wearable medical device.

Additionally, with a growing interest on the method of delivering medication by implanting a small pump inside the human body, interest in the electroosmotic pump which can be stably operated without any side reaction is gradually increasing, and accordingly, studies for the improvement of stability, lifespan characteristics, and efficiency of the electroosmotic pump are underway.

SUMMARY OF CERTAIN INVENTIVE ASPECTS

In an exemplary embodiment, the present invention provides an electroosmotic pump in which no side reaction due to consumption or detachment of the electrochemical reaction material occurs even after a long-time operation and thus no subsequent increase in current consumption and power consumption occurs, thus having excellent stability, lifespan characteristics, and efficiency.

In another exemplary embodiment, the present invention provides a fluid-pumping system including the electroosmotic pump.

In an exemplary embodiment, the present invention provides an electroosmotic pump, which includes: a membrane; a first electrode which is provided on one surface of the membrane, including a porous support including an insulator and an electrochemical reaction material formed on the porous support; and a second electrode which is provided on the other surface of the membrane, including a porous support including an insulator and an electrochemical reaction material formed on the porous support.

The insulator may include at least one selected from the group consisting of a ceramic not showing conductivity, a polymer resin not showing conductivity, glass not showing conductivity, and a combination thereof.

The ceramic not showing conductivity may include at least one selected from the group consisting of rockwool, gypsum, ceramics, cement, and a combination thereof.

The polymer resin not showing conductivity may include at least one selected from the group consisting of: a synthetic fiber, which is selected from the group consisting of polypropylene, polyethylene terephthalate, polyacrylonitrile, and a combination thereof; a natural fiber, which is selected from the group consisting of wool, cotton, and a combination thereof; a sponge; a porous material derived from a biological organism; and a combination thereof.

The glass not showing conductivity may include at least one selected from the group consisting of glass wool, glass frit, porous glass, and a combination thereof.

The porous support may have a shape of a non-woven fabric, a woven fabric, a sponge, or a combination thereof.

The porous support may have a pore size of about 0.1 μm to about 500 μm.

The porous support may have porosity of about 5% to about 95%.

The electrochemical reaction material may include at least one selected from the group consisting of silver/silver oxide, silver/silver chloride, and a combination thereof.

In another exemplary embodiment, the present invention provides a fluid-pumping system including the electroosmotic pump.

The electroosmotic pump according to an exemplary embodiment has advantages in that no side reaction due to the consumption or detachment of the electrochemical reaction material occurs even after a long-time operation and thus no subsequent increase in current consumption and power consumption occurs, thereby being able to improve stability, life characteristics, and efficiency, while reducing manufacturing cost because a high-cost carbon electrode (e.g., carbon paper electrode, carbon woven-fabric electrode, etc.) is not used.

DETAILED DESCRIPTION OF CERTAIN ILLUSTRATIVE EMBODIMENTS

Figure 1:
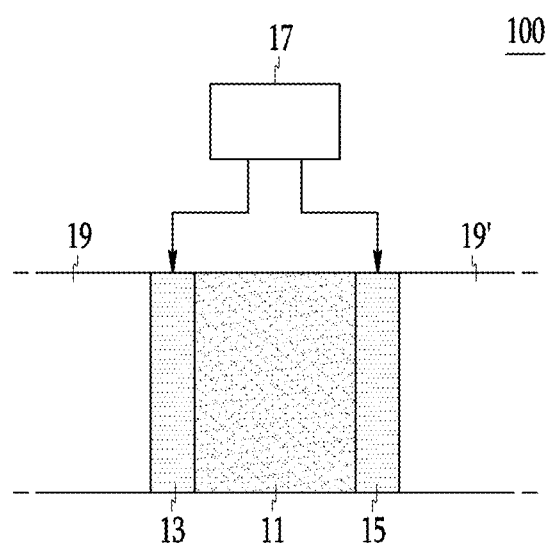
FIG. 1 is a schematic diagram illustrating an electroosmotic pump according to an exemplary embodiment of the present invention.

Hereinafter, exemplary embodiments of the present invention will be described in detail so that those of ordinary skill in the art to which the present invention pertains can easily carry it out with reference to accompanying drawings. However, the present invention may be embodied in many different forms, and is not limited to these embodiments described herein.

In the drawings, the thickness of layers, regions, etc., are exaggerated for clarity. Like reference numerals designate like elements throughout the specification. When a part of a layer, film, coating, etc. is referred to as being "on" another constituent element, it includes not only the case of "on top of" another constituent element but also the case where another constituent element is disposed therebetween.

Throughout the specification, when a part "comprises" certain constituent elements, it means that the part may include other constituent elements, without excluding other constituent elements, unless otherwise specifically indicated, and "combination" means mixing, polymerization, or copolymerization.

Hereinafter, the electroosmotic pump according to an exemplary embodiment of the present invention will be explained referring to FIG. 1 to FIG. 4.

FIG. 1 is a schematic diagram illustrating an electroosmotic pump according to an exemplary embodiment of the present invention.

Referring to FIG. 1, the electroosmotic pump 100 includes a membrane 11; a first electrode 13 which is provided on one surface of the membrane 11, including a porous support including an insulator and an electrochemical reaction material formed on the porous support; and a second electrode 15 which is provided on the other surface of the membrane 11, including a porous support including an insulator and an electrochemical reaction material formed on the porous support.

The first electrode 13 and the second electrode 15 are connected to a power supply part 17. The first electrode 13 and the second electrode 15 may be connected to the power supply part 17 by, for example, a lead wire, but the connecting means is not limited thereto as long as they can be electrically connected.

The membrane 11 is installed in fluid pathway parts 19 and 19' through which fluid is moved, and it may have a porous structure to enable the movement of a fluid and ions therethrough.

The membrane 11 may be a frit-type membrane manufactured by sintering spherical silica with heat, but the membrane is not limited thereto, and any material such as a porous silica or porous alumina that can cause an electrokinetic phenomenon by a zeta potential may be used.

The spherical silica used in the formation of the membrane may have a diameter of about 20 nm to about 500 nm, specifically about 30 nm to about 300 nm, and more specifically about 40 nm to about 200 nm. When the diameter of the spherical silica is within the above range, the electroosmotic pump may be able to generate a greater pressure.

The membrane 11 may have a thickness of about 20 μm to about 10 mm, specifically about 300 μm to about 5 mm, and more specifically about 1000 μm to about 4 mm. When the thickness of the membrane 11 is within the above range, the membrane can exhibit sufficient strength to withstand a mechanical impact being applied during the manufacture, use, or storage of the electroosmotic pump, and it can also exhibit a sufficient flow amount to be used as a pump for drug delivery.

The first electrode 13 and the second electrode 15 respectively include a porous support including an insulator and an electrochemical reaction material formed on the porous support. In particular, the porous support including an insulator which are included in the first electrode 13 and the second electrode 15 respectively may be the same as or different from each other, and the electrochemical reaction material which are included in the first electrode 13 and the second electrode 15 respectively may be the same as or different from each other.

The first electrode 13 and the second electrode 15 may facilitate effective movement of the fluid and ions by having a porous structure.

The insulator forming the porous support may include at least one selected from the group consisting of a ceramic not showing conductivity, a polymer resin not showing conductivity, glass not showing conductivity, and a combination thereof, but the insulator is not limited thereto.

As such, when a porous support including an insulator is used in the first electrode 13 and the second electrode 15, the electrochemical reaction material used in the first electrode 13 and the second electrode 15 is consumed or detached after a long-time operation of the electroosmotic pump, and thus, even when the porous support is exposed, the side reaction (e.g., water electrolysis) that had conventionally occurred due to the exposure of carbon paper or carbon woven-fiber when the carbon paper or carbon woven-fiber were used does not occur, and thereby unnecessary current consumption and power consumption can be prevented. By doing so, an electroosmotic pump which has a stable operation characteristic, excellent lifespan stability, excellent electrical efficiency, and that can reduce manufacturing cost can be implemented.

The ceramic not showing conductivity may include at least one selected from the group consisting of rockwool, gypsum, ceramics, cement, and a combination thereof, and specifically at least one selected from the group consisting of rockwool, gypsum, and a combination thereof, but the ceramic not showing conductivity is not limited thereto.

Meanwhile, the ceramic not showing conductivity may be, for example, a sintered material of a ceramic powder or natural porous ceramic, but the ceramic not showing conductivity is not limited thereto.

The polymer resin not showing conductivity may include at least one selected from the group consisting of: a synthetic fiber, which is selected from the group consisting of polypropylene, polyethylene terephthalate, polyacrylonitrile, and a combination thereof; a natural fiber, which is selected from the group consisting of wool, cotton, and a combination thereof; a sponge; a porous material derived from a biological organism (e.g., bones of a biological organism); and a combination thereof, but the polymer resin not showing conductivity is not limited thereto.

The glass not showing conductivity may include at least one selected from the group consisting of glass wool, glass frit, porous glass, and a combination thereof, but the glass not showing conductivity is not limited thereto.

The porous support may conventionally have a form of a non-woven fabric, woven fabric, sponge, or a combination thereof, but the form of the porous support is not limited thereto as long as the support has porosity thus enabling transport of a fluid and ions.

The porous support may have a pore size of about 0.1 μm to about 500 μm, specifically about 5 μm to about 300 μm, and more specifically of about 10 μm to about 200 μm. When the pore size of the porous support is within the above range, a fluid and ions can effectively move, and thus the stability, lifespan characteristic, and efficiency of the electroosmotic pump can be effectively improved.

The porous support may have porosity of about 5% to about 95%, specifically about 50% to about 90%, and more specifically about 60% to about 80%. When the porosity of the porous support is within the above range, a fluid and ions can effectively move, and thus the stability, lifespan characteristic, and efficiency of the electroosmotic pump can be effectively improved.

As the electrochemical reaction material, any material that can form a pair of reactions where an anode and a cathode can give and take positive ions (e.g., hydrogen ions ($H^+$)) and simultaneously constitute a reversible electrochemical reaction during the electrode reactions, such as silver/silver oxide and silver/silver chloride, can be used.

Specifically, the electrochemical reaction material may include at least one selected from the group consisting silver/silver oxide, silver/silver chloride, $MnO(OH)$, polyaniline, polypyrrole, polythiophene, polythionine, a quinone-based polymer, and a combination thereof.

When the electrochemical reaction material as described above is used, oxidation and reduction are possible by a method other than water electrolysis, and thus the stability, lifespan characteristic, and efficiency of the electroosmotic pump can be effectively improved.

The electrochemical reaction material may be formed by electrodeposition or coating on a porous support including the insulator using methods such as electroless plating, plating, vacuum deposition, coating, a sol-gel process, etc., but the methods are not limited thereto, and the electrochemical reaction material may be formed on a porous support including the insulator using an appropriate method according to the kinds of the electrochemical reaction material being used.

The power supply part 17 is connected to the first electrode 13 and the second electrode 15 to provide power so that an electrochemical reaction can occur in the first electrode 13 and the second electrode 15, and the electrochemical reaction of the first electrode 13 and the second electrode 15 can occur by the transport of positive ions.

The power supply part 17 can alternately supply the polarity of a voltage to the first electrode 13 and the second electrode 15, and in particular, what is meant by the power supply part 17 alternately supplying the polarity of a voltage may include the meaning that the current is alternately supplied in opposite directions. By such a process, the electroosmotic pump 100 can generate a pressure (pumping power) by the movement of a fluid, and simultaneously, the consumption and regeneration of the electrochemical reaction material of the first electrode 13 and the second electrode 15 can repeatedly occur.

For example, the power supply part 17 may include a DC voltage supply part (not shown) that supplies a DC voltage to each of the first electrode 13 and the second electrode 15. Additionally, the power supply part 17 may include a voltage direction conversion part (not shown) that alternately converts the polarity of the DC voltage supplied to each of the first electrode 13 and the second electrode 15 at predetermined times. From the above, it is possible to continuously change the voltage applied to each of the first electrode 13 and the second electrode 15 to an opposite polarity at predetermined times.

The fluid pathway parts 19 and 19' provide the movement pathway of a fluid that moves in both directions with the membrane 11, the first electrode 13 and the second electrode 15 disposed therebetween.

In particular, the fluid pathway parts 19 and 19' may have a container shape where a fluid is filled inside (e.g., a cylindrical shape), but the shape is not limited thereto.

The fluid not only can fill in the fluid pathway parts 19 and 19', but also the membrane 11 and the first and second electrodes 13 and 15.

The fluid pathway parts 19 and 19' may have an opening for the transfer of pressure (pumping power). For example, the opening may be formed on any one space or both spaces of the spaces divided into two parts by the membrane 11 and the first and second electrodes 13 and 15, and thereby provide the pressure (pumping power) by the movement of a fluid to the outside.

Figure 2A:
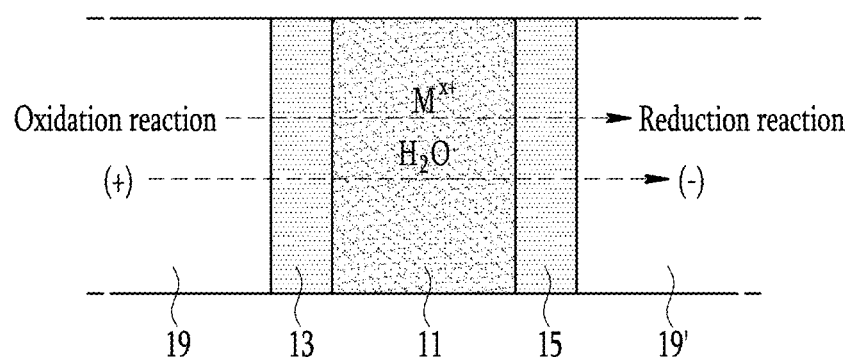
FIG. 2A and FIG. 2B are schematic diagrams illustrating reversible electrode reactions in an electroosmotic pump according to an exemplary embodiment of the present invention, and subsequent movements of ions and a fluid.
Figure 2B:
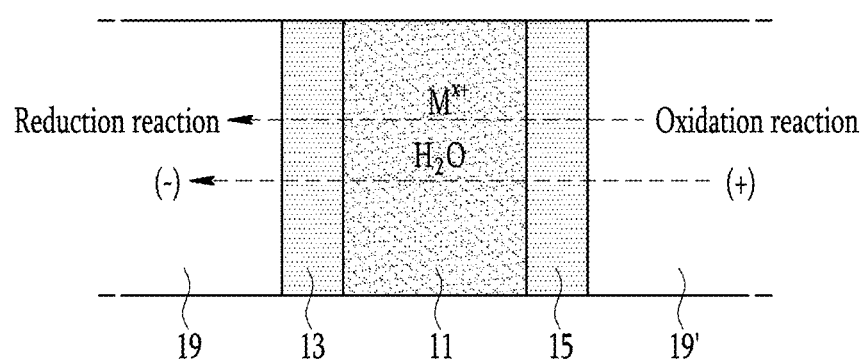

FIG. 2A and FIG. 2B are schematic diagrams illustrating reversible electrode reactions in an electroosmotic pump according to an exemplary embodiment of the present invention, and subsequent movements of ions and a fluid.

Referring to FIG. 2A and FIG. 2B, when a voltage is differently supplied to the first electrode 13 and the second electrode 15, for example, with a difference in the polarity of a voltage through the power supply part 17, a voltage difference occurs between the first electrode 13 and the second electrode 15.

By such a voltage difference, as a result of an electrode reaction, positive ions ($M^{x+}$) are produced in the anode, and as the positive ions ($M^{x+}$) move toward the cathode, they move along with a fluid thereby generating a fluid movement amount and a pressure (pumping power).

When power is supplied to the first electrode 13 and the second electrode 15 through the power supply part 17, the anode and the cathode can be changed by alternately supplying the polarity of a voltage, and as a result, the movement direction of ions and a fluid, and the direction of the pressure (pumping power) and the fluid amount, can be changed.

When the role of the electrode which had served as an anode is changed to serve as a cathode due to the alternating supply of the voltage polarity, the electrochemical reactive material which was consumed when the electrode was used as an anode can be recovered as the electrode is used as a cathode, and vice versa, thereby enabling the continuous operation of the electroosmotic pump.

Taking a case where a silver/silver oxide is used as an electrochemical reaction material and an aqueous solution is used as a fluid as an example, a reaction as shown in Reaction Scheme 1 occurs in an anode and a reaction as shown in Reaction Scheme 2 occurs in a cathode. In this case, the positive ions which move are hydrogen ions (H$^+$), and hydrogen ions (H$^+$) have a relatively rapid speed of ion transport and thus the transport speed of the fluid which moves along with the ions can be rapid as well, thus being able to effectively improve the performance of the electroosmotic pump 100.

$$Ag(s)+H_2O \rightarrow Ag_2O(s)+2H^++2e^-$$ [Reaction Scheme 1]

$$Ag_2O(s)+2H^++2e^- \rightarrow Ag(s)+H_2O$$ [Reaction Scheme 2]

In a case where a material other than the silver/silver oxide is used in the first electrode 13 and second electrode 15 as an electrochemical reaction material and a material other than an aqueous solution is used as a fluid, it is natural that the oxidation/reduction reaction scheme may vary accordingly, and the positive ions being produced and transported may vary.

Figure 3:
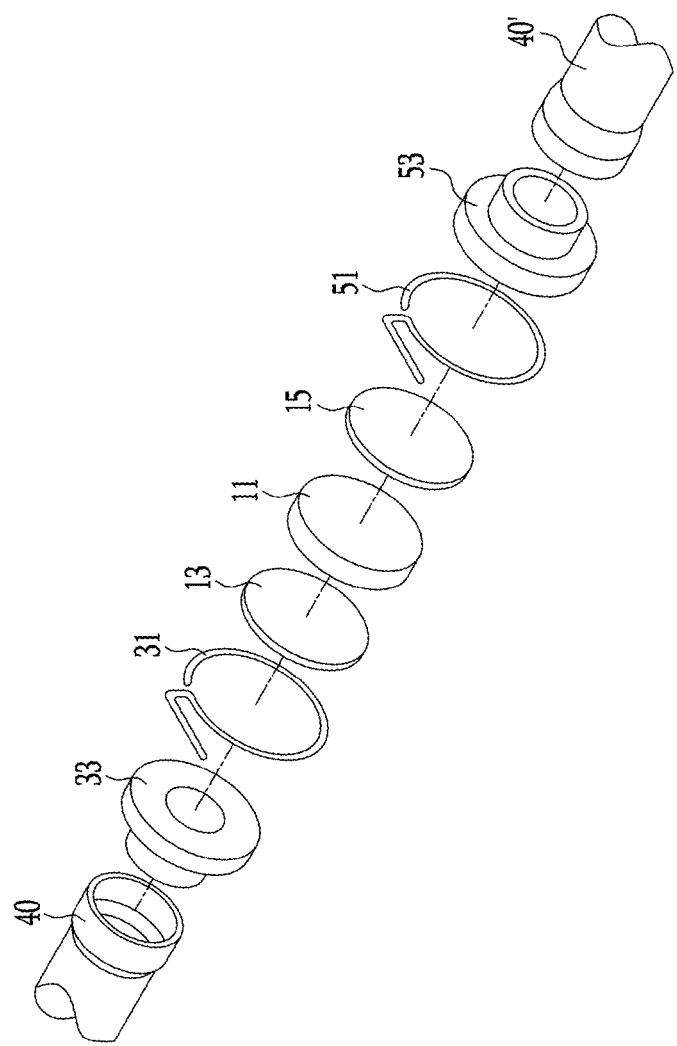
FIG. 3 is an exploded perspective view of an electroosmotic pump according to an exemplary embodiment of the present invention.
Figure 4:
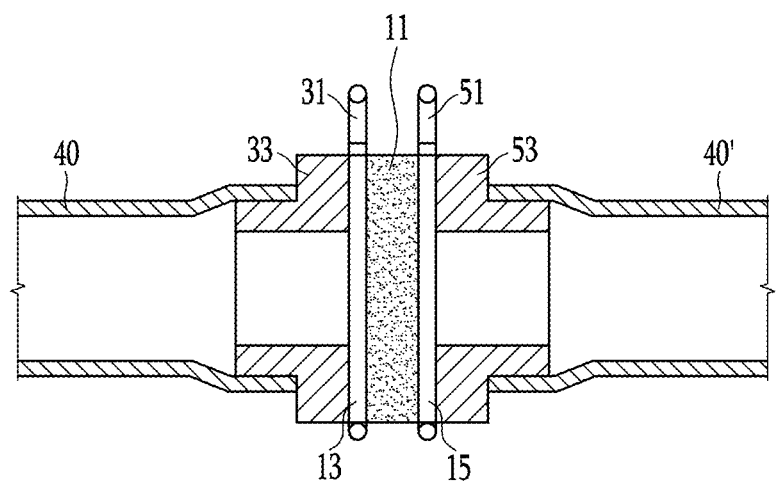
FIG. 4 is a cross-sectional view of the electroosmotic pump illustrated in FIG. 3.

FIG. 3 is an exploded perspective view of an electroosmotic pump according to an exemplary embodiment of the present invention, and FIG. 4 is a cross-sectional view of the electroosmotic pump illustrated in FIG. 3.

Referring to FIG. 3 and FIG. 4, the membrane 11 may be in the form of a disc. In particular, a coating material, a barrier sheet, an adhesive sheet, etc. may be bonded onto the external circumferential surface of the membrane 11 to prevent fluid leakage.

Additionally, the first electrode 13 and second electrode 15 may have a disc shape so as to correspond to the shape of the membrane 11, and in particular, a coating material, a barrier sheet, an adhesive sheet, etc. may also be bonded onto the external circumferential surface of the first electrode 13 and the second electrode 15 to prevent fluid leakage.

The first fluid pathway part (19, see FIG. 1) may include a first cap 33 of the hollow space to be bonded to the first electrode 13.

Additionally, the second fluid pathway part (19', see FIG. 1) may include a second cap 53 of the hollow space to be bonded to the second electrode 15.

Between the two ends of the first cap 33 and the second cap 53, the end where the first electrode 13 and the second electrode 15 are located and the end which is located at the opposite end may be connected to a first tube 40 and a second tube 40', where a fluid can be transported.

The first tube 40 and second tube 40' may be, for example, silicone tubes, but the tube material is not limited thereto.

The electroosmotic pump 100 may include a first contact strip 31 which is to be integrated into the external circumferential surface of the first electrode 13.

Additionally, the electroosmotic pump 100 may include a second contact strip 51 which is to be integrated into the external circumferential surface of the second electrode 15.

The first contact strip 31 and the second contact strip 51 may each be connected to the power supply part 17, and thereby deliver a voltage or current to the first electrode 13 and the second electrode 15, respectively.

The first contact strip 31 and the second contact strip 51 may include a conductive material. Specifically, first contact strip 31 and the second contact strip 51 may include silver (Ag), copper (Cu), etc., but the elements are not limited thereto.

The first contact strip 31 and the second contact strip 51, as shown in FIG. 3, may be in a circular form where the first electrode 13 and the second electrode 15 each external circumferential surface are integrated thereinto, but the form is not limited thereto.

In another exemplary embodiment, the present invention provides a fluid pumping system including the electroosmotic pump. The fluid pumping system may be formed in a structure that is generally used in the art, and thus specific details are omitted herein.

MODE FOR CARRYING OUT THE INVENTION

Hereinafter, the present invention will be described in more detail with reference to examples and comparative examples. However, these examples and comparative examples are for illustrative purposes only and are not intended to limit the scope of the present invention.

EXAMPLES

Example 1: Preparation of Polyethylene Terephthalate (PET) Non-Woven Fabric Electrode Coated with Silver (Ag)

10 g of polyethylene terephthalate non-woven fabric (Huvis, LMF degree) with a thickness of 0.2 mm was washed with an aqueous NaOH solution (1.6 g NaOH/100 mL water) at room temperature for 30 minutes, washed several times with distilled water, conditioned with an aqueous solution of polyethylene glycol (PEG 1000, 0.08 g polyethylene glycol/100 mL water), and washed again with distilled water.

While repeating stirring and washing, the resultant was subjected to a sensitization process using $SnCl_2$ (0.8 g $SnCl_2$/100 mL water) for 5 minutes and then to an activation process using $PdCl_2$ (0.04 g $PdCl_2$/100 mL water) for 30 minutes. Then, the resultant was subjected to an acceleration process using a 10% aqueous HCl solution at room temperature for 30 minutes and then washed with distilled water.

The polyethylene terephthalate non-woven fabric, which underwent pretreatment processes, was put in a silver solution composed of silver nitrate, sodium hydroxide, and ammonia, and a reducing solution where sodium hypophosphite were dissolved, and subjected to electroless plating for 1 hour in total.

The polyethylene terephthalate non-woven fabric coated with silver was anodized under a potential difference of 2 V at both ends using a silver plate as a counter electrode so as to produce $Ag_2O$ particles on the surface, and the same was used as a porous electrode for the electroosmotic pump.

Figure 5:
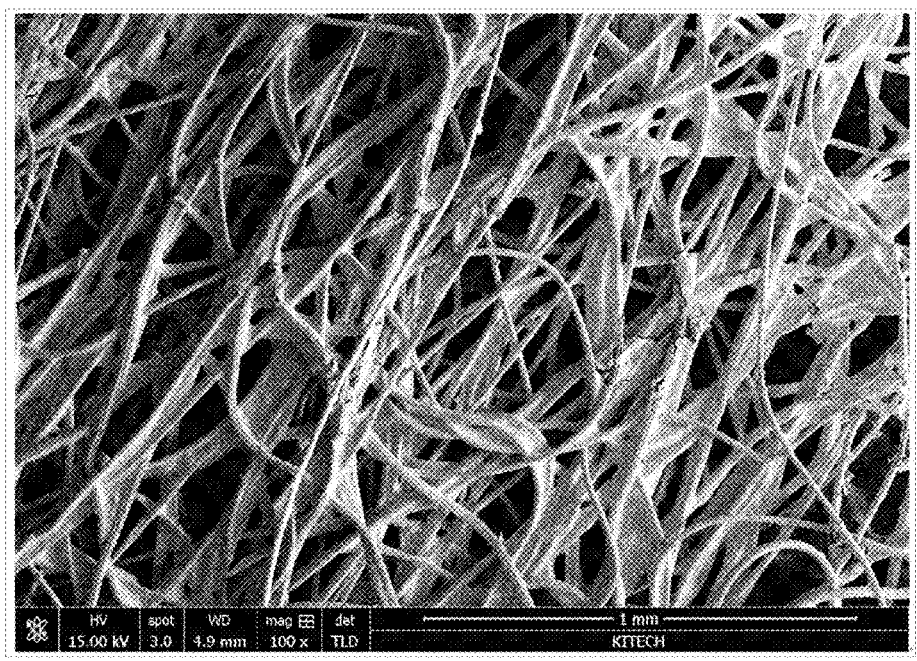
FIG. 5 is an electron microscope image of an electrode manufactured according to Example 1.

FIG. 5 is an electron microscope image of an electrode manufactured according to Example 1.

By observing the morphology of the silver and silver oxidecoated on the polyethylene terephthalate non-woven fabric from FIG. 5, it can be confirmed that the silver/silver oxide is very uniformly distributed while maintaining overall porosity.

Example 2: Preparation of Electroosmotic Pump

An electroosmotic pump having the same shape as those of FIG. 3 and FIG. 4 was prepared. The membrane was prepared by loading spherical silica (diameter 300 nm) in a mold to be formed into a coin shape with an exterior diameter of 8 mm and a thickness of 1 mm by applying a load of 1 ton and sintering at 700° C.

The electrodes prepared in Example 1 were processed into a circular shape having an exterior diameter of 8 mm and stacked up on both sides of the membrane, and subsequently, a contact strip and a cap were installed, and the exterior was sealed using an epoxy resin.

Comparative Example 1: Preparation of Carbon Paper Electrode Coated with Silver (Ag)

Carbon paper with a thickness of 0.28 mm (Toray, Japan, THP-H-090) was subjected to plasma treatment in a low pressure plasma device for 1 hour.

The plasma-treated carbon paper was installed in an electroplating tank and coated with silver at a current density of 30 mA/cm$^2$ for 10 minutes. The silver-coated carbon paper was transferred into a different electroplating tank and anodized at a current of 15 mA/cm$^2$ such that an electrode where an $Ag_2O$ layer was coated on the surface was prepared.

The electrode was prepared as a circular electrode with an exterior diameter of 8 mm.

Comparative Example 2: Preparation of Electroosmotic Pump

An electroosmotic pump was prepared in the same manner as in Example 2, except that the electrodes prepared in Comparative Example 1 were used instead of the electrodes prepared in Example 1.

Test Example 1

Evaluation of Performance of Electroosmotic Pump

A potential difference of 2 V was applied to each of the two electrodes of the electroosmotic pumps prepared in Example 2 and Comparative Example 2 at alternate intervals of 1 minute for 10 minutes, and the resulting current response characteristics were evaluated. Additionally, a potential difference of 2 V was applied to each of the two electrodes of the electroosmotic pumps prepared in Example 2 and Comparative Example 2 at alternate intervals of 1 minute for 14 hours, and the resulting current response characteristics were evaluated.

Figure 6:
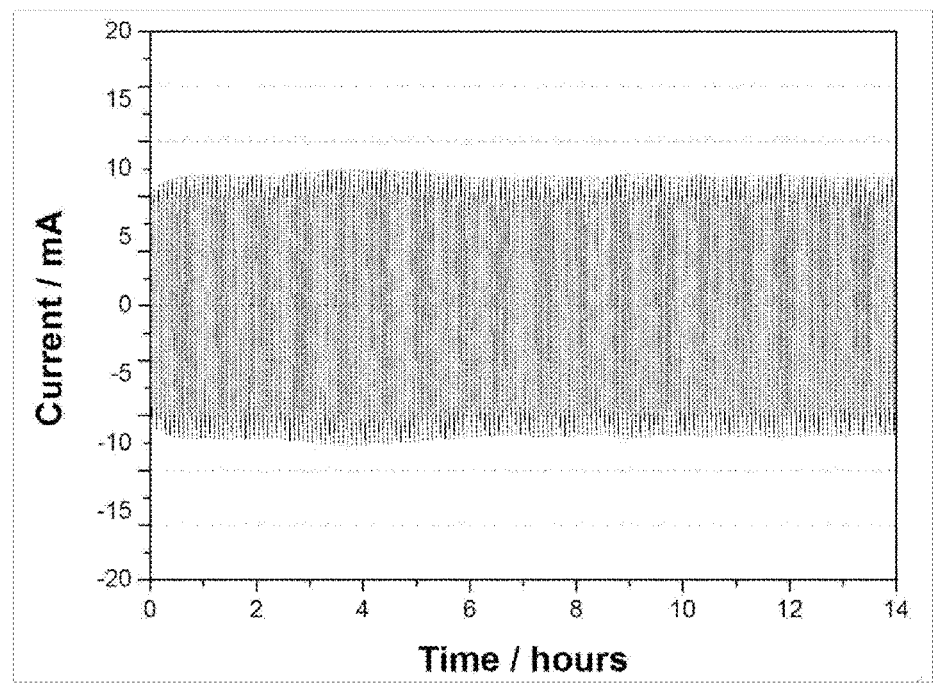
FIG. 6 is a current characteristic curve of the electroosmotic pump manufactured in Example 2 for a period of 14 hours.
Figure 7:
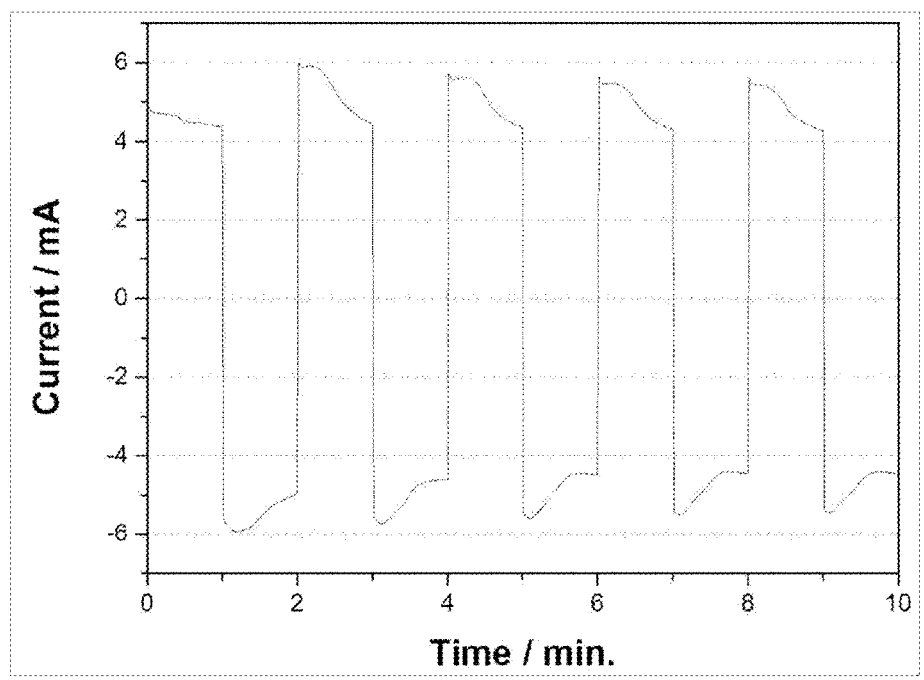
FIG. 7 is a current characteristic curve of the electroosmotic pump manufactured in Comparative Example 2 for a period of 10 minutes.
Figure 8:
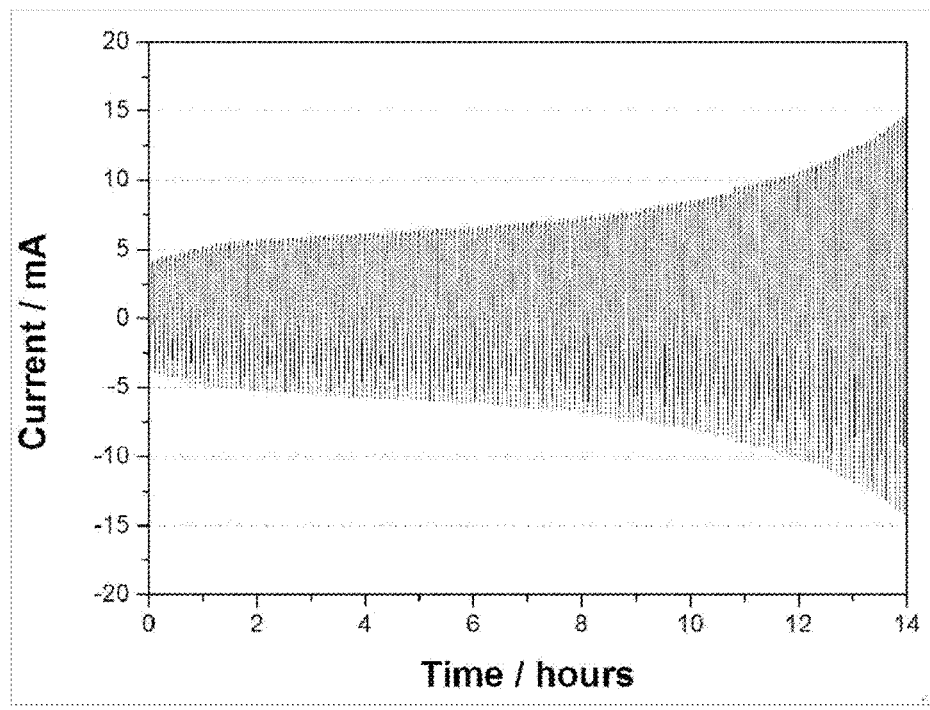
FIG. 8 is a current characteristic curve of the electroosmotic pump manufactured in Comparative Example 2 for a period of 14 hours.

The current characteristic curve of the electroosmotic pump prepared in Example 2 for a period of 14 hours is shown in FIG. 6, the current characteristic curve of the electroosmotic pump prepared in Comparative Example 2 for a period of 10 minutes is shown in FIG. 7, and the current characteristic curve of the electroosmotic pump prepared in Comparative Example 2 for a period of 14 hours is shown in FIG. 8, respectively.

According to what is shown in FIG. 6, it was confirmed that, in the electroosmotic pump prepared in Example 2, a constant current flow was maintained even after a long-time operation.

Meanwhile, according to what is shown in FIGS. 7 and 8, in the electroosmotic pump prepared in Comparative Example 2, the current flow therein was maintained for about 10 minutes, but the current rapidly increased as the operation time increased thereby increasing the power consumption. From the above results, it was confirmed that, in the electroosmotic pump prepared in Comparative Example 2, as the operation time became longer, the carbon paper was exposed due to the consumption or detachment of the silver/silver oxide (i.e., the electrochemical reaction material), and the exposed carbon paper caused a side reaction (e.g., electrolysis of water) thereby rapidly increasing the power consumption of the electroosmotic pump.

As a result, it was confirmed that the electroosmotic pump prepared in Example 2 was superior with respect to stability, lifespan characteristic, and efficiency, compared to that of the electroosmotic pump prepared in Comparative Example 2.

Although the preferred embodiments of the present invention have been described above, the present invention is not limited thereto, and it will be apparent to those skilled in the art that various changes and modifications may be made within the scope of the claims, the detailed description of the invention, and the accompanying drawings.

As described above, the electroosmotic pump according to the present invention includes electrodes containing a porous support including an insulator and an electrochemical reaction material formed on the porous support, and as a result, even after a long-time operation, neither a side reaction due to the consumption or detachment of the electrochemical reaction material nor a subsequent increase in current consumption or power consumption occurs, thereby enabling the improvement of stability, lifespan characteristics, and efficiency.

What is claimed is:

1. An electroosmotic pump, comprising:
    a membrane;
    a first electrode having porosity and disposed on a first major surface of the membrane, the first electrode comprising a first insulating porous support and a first electrochemical reaction material coated on the first insulating porous support; and
    a second electrode having porosity and disposed on a second major surface of the membrane, the second electrode comprising a second insulating porous support and a second electrochemical reaction material coated on the second insulating porous support,
    wherein the first electrochemical reaction material is substantially uniformly distributed on the first insulating porous support while maintaining overall porosity, and
    wherein the second electrochemical reaction material is substantially uniformly distributed on the second insulating porous support while maintaining overall porosity.

2. The electroosmotic pump of claim 1, wherein one or both of the first and second insulating porous supports comprise an electrically insulating ceramic, an electrically insulating polymer resin, an electrically insulating glass, or a combination thereof.

3. The electroosmotic pump of claim 2, wherein the electrically insulating ceramic comprises rockwool, gypsum, ceramic, cement, or a combination thereof.

4. The electroosmotic pump of claim 2, wherein the electrically insulating polymer resin comprises: a synthetic fiber selected from the group consisting of polypropylene, polyethylene terephthalate, polyacrylonitrile, or a combination thereof; a natural fiber selected from the group consisting of wool, cotton, or a combination thereof; a sponge; a porous material derived from a biological organism; or a combination thereof.

5. The electroosmotic pump of claim 2, wherein the electrically insulating glass comprises glass wool, glass frit, porous glass, or a combination thereof.

6. The electroosmotic pump of claim 1, wherein one or both of the first and second insulating porous supports are in the form of a non-woven fabric, a woven fabric, sponge, or a combination thereof.

7. The electroosmotic pump of claim 1, wherein one or both of the first and second insulating porous supports have pores having a size of 0.1 μm to 500 μm.

8. The electroosmotic pump of claim 1, wherein one or both of the first and second insulting porous supports have a porosity of 5% to 95%.

9. The electroosmotic pump of claim 1, wherein one or both of the first and second electrochemical reaction materials comprise silver/silver oxide, silver/silver chloride, or a combination thereof.

10. A fluid-pumping system comprising the electroosmotic pump according to claim 1.

11. A fluid-pumping system comprising the electroosmotic pump according to claim 2.

12. A fluid-pumping system comprising the electroosmotic pump according to claim 3.

13. A fluid-pumping system comprising the electroosmotic pump according to claim 4.

14. A fluid-pumping system comprising the electroosmotic pump according to claim 5.

15. A fluid-pumping system comprising the electroosmotic pump according to claim 6.

16. A fluid-pumping system comprising the electroosmotic pump according to claim 7.

17. A fluid-pumping system comprising the electroosmotic pump according to claim 8.

18. A fluid-pumping system comprising the electroosmotic pump according to claim 9.

* * * * *